(12) United States Patent
Adams (10) Patent No.: US 8,770,985 B2
(45) Date of Patent: Jul. 8, 2014

(54) HEIMLICH OR ABDOMINAL THRUST MANEUVER TEACHING AID FOR CHOKING RELIEF OR RESCUE

(76) Inventor: Timothy Adams, El Dorado Hills, CA (US)

( * ) Notice: Subject to any disclaimer, the term of this patent is extended or adjusted under 35 U.S.C. 154(b) by 1366 days.

(21) Appl. No.: 12/171,212

(22) Filed: Jul. 10, 2008

(65) Prior Publication Data

US 2009/0017431 A1    Jan. 15, 2009

Related U.S. Application Data

(60) Provisional application No. 60/948,944, filed on Jul. 10, 2007.

(51) Int. Cl.
*G09B 23/28* (2006.01)

(52) U.S. Cl.
USPC .......................... 434/265; 434/262

(58) Field of Classification Search
CPC ........ G09B 23/00; G09B 23/28; G09B 23/30; G09B 23/288; A63B 2220/53
USPC ........... 434/262, 265, 267; 73/379.04, 379.09
See application file for complete search history.

(56) References Cited

U.S. PATENT DOCUMENTS

| | | | | |
|---|---|---|---|---|
| 750,593 A * | 1/1904 | Cady | ........................... | 73/379.04 |
| 1,267,567 A * | 5/1918 | Lundgren | ....................... | 40/538 |
| 1,873,160 A | 2/1929 | Sturtevant | | |
| 3,550,159 A * | 12/1970 | Alarco | .............................. | 2/463 |
| 4,192,301 A | 3/1980 | Hardwick | | |
| 4,194,303 A * | 3/1980 | Heller | ........................... | 434/267 |
| 4,208,048 A * | 6/1980 | Winterbottom | ................. | 482/84 |
| 4,291,704 A | 9/1981 | Petty et al. | | |
| 4,530,496 A * | 7/1985 | Smith et al. | ................... | 482/112 |
| 4,531,919 A * | 7/1985 | Ware | ............................. | 434/262 |
| 4,592,371 A * | 6/1986 | Pellicano et al. | ............. | 600/587 |
| 4,820,236 A * | 4/1989 | Berliner et al. | ............... | 446/369 |
| 5,131,408 A * | 7/1992 | Smith | ........................... | 600/587 |
| 5,154,167 A | 10/1992 | Hepburn | | |
| 5,165,393 A | 11/1992 | Kawaguchi | | |
| 5,423,685 A | 6/1995 | Adamson et al. | | |
| 5,752,502 A | 5/1998 | King | | |

(Continued)

FOREIGN PATENT DOCUMENTS

WO    WO 48692 A1 *  8/2000

OTHER PUBLICATIONS

PCT/US08/69703, International Search Report and Written Opinion, Feb. 24, 2010.

(Continued)

*Primary Examiner* — Gene Kim
*Assistant Examiner* — Alyssa Hylinski
(74) *Attorney, Agent, or Firm* — John P. O'Banion (57) ABSTRACT

An apparatus for teaching proper technique for the Heimlich or Abdominal Thrust maneuver. When the Heimlich or Abdominal Thrust maneuver is applied to the apparatus by a user, an indicator is provided to show the user whether proper technique was used. The apparatus can take the form of a wearable garment or a form, either of which may mimic the shape of a person. The apparatus is scalable, and may be made to mimic the shapes of persons of various sizes, including infants and animals, if desired. Indicators can be included to measure the effectiveness of other techniques often used in conjunction with the Heimlich or Abdominal Thrust maneuver.

19 Claims, 5 Drawing Sheets

(56) References Cited

U.S. PATENT DOCUMENTS

| | | | |
|---|---|---|---|
| 5,913,708 A * | 6/1999 | Gross | 446/385 |
| 6,471,621 B2 | 10/2002 | Horstel et al. | |
| 6,508,250 B1 | 1/2003 | Esnouf | |
| 6,530,783 B1 * | 3/2003 | McGinnis | 434/265 |
| 6,539,941 B2 | 4/2003 | Haubell | |
| 7,032,596 B2 | 4/2006 | Thompson et al. | |
| 7,077,135 B2 | 7/2006 | Pagan | |
| 7,566,328 B2 * | 7/2009 | Hooper | 604/357 |
| 2004/0154403 A1 * | 8/2004 | Petrucelli | 73/753 |
| 2005/0058977 A1 | 3/2005 | Cantrell et al. | |
| 2005/0204807 A1 * | 9/2005 | Tseng | 73/146 |
| 2007/0292828 A1 * | 12/2007 | Kellermann et al. | 434/262 |
| 2009/0293587 A1 * | 12/2009 | Mages | 73/12.01 |

OTHER PUBLICATIONS

Laerdal Medical, "Choking Charlie", downloaded from Internet Sep. 15, 2011, 1 page document.

* cited by examiner

HEIMLICH OR ABDOMINAL THRUST MANEUVER TEACHING AID FOR CHOKING RELIEF OR RESCUE

CROSS-REFERENCE TO RELATED APPLICATIONS

This application claims priority to U.S. application Ser. No. 60/948,944 filed on Jul. 10, 2007, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to medical training devices, and more particularly to an apparatus for use in teaching proper Heimlich or Abdominal Thrust maneuver technique.

2. Description of Related Art

The effectiveness of teaching aids for medical procedures is undisputed. CPR training, for example, regularly uses both adult- and child-size dummies to teach proper technique. To date, however, no simple or inexpensive method has been developed to teach the proper technique for the Heimlich or Abdominal Thrust maneuver. Trainees are usually forced to practice on themselves using improper methods, and, as a result, are often unable to provide the requisite force necessary to dislodge an obstructing object from a choking person.

BRIEF SUMMARY OF THE INVENTION

The present invention is a simple and effective apparatus that provides a visual indicator of whether a trainee has mastered proper Heimlich or Abdominal Thrust maneuver technique. An inflatable bladder with a tube is provided, and a small, light object, such as a modified ping-pong ball, is placed into the free end of the tube. The bladder may be strapped to a person or to a dummy to rest in the proper position. Alternatively, the bladder may be part of a vest or covering that mimics a body or the lower portion of a rib cage, such that proper positioning is shown. An indentation for thumb or first placement may also be present on the bladder. Regardless of the embodiment of the bladder, when proper technique is used, the object or ball is forcefully expelled from the tube.

An aspect of the invention is an apparatus for teaching proper Heimlich or Abdominal Thrust maneuver technique, comprising an inflatable bladder; a tube having first and second ends, the first end connected to the bladder; and an indicator associated with the second end of the tube; wherein the indicator is adapted to provide feedback regarding the effectiveness of Heimlich or Abdominal Thrust maneuver technique on the bladder.

In one embodiment of this aspect, the bladder has means to attach the bladder to a person or an inanimate body. In another embodiment, the bladder is contained in a wearable garment. In one mode of this embodiment, the wearable garment comprises front and back portions; the back portion comprises a slap indicator associated with an area of the back portion; and the slap indicator is adapted to provide feedback regarding a slap administered to the area of the back portion.

In yet another embodiment, the indicator is insertible into the tube; and the indicator is forced out of the tube when proper Heimlich or Abdominal Thrust maneuver technique is applied to the bladder. In another embodiment, the indicator is physically attached to the apparatus; and the indicator remains attached to the apparatus while providing feedback.

In still another embodiment, the indicator provides visual feedback. In another embodiment, the indicator provides non-visual feedback.

Another aspect of the present invention is an apparatus for teaching proper Heimlich or Abdominal Thrust maneuver technique, comprising: a wearable garment or form; wherein the wearable garment or form comprises: an air bladder or cavity, and a tube having first and second ends, the first end connected to the air bladder or cavity; and an indicator associated with the second end of the tube; wherein the indicator provides feedback regarding the effectiveness of Heimlich or Abdominal Thrust maneuver technique on the bladder or cavity.

In one embodiment of this aspect, the air bladder or cavity is molded into the wearable garment or form. In another embodiment, the air bladder or cavity is removable from the wearable garment or form. In another embodiment, the wearable garment or form mimics at least a portion of a mammal.

In one embodiment of this aspect, the indicator provides visual feedback. In another embodiment, the indicator provides non-visual feedback.

In yet another embodiment, the wearable garment or form comprises front and back portions; the back portion comprises a slap indicator associated with an area of the back portion; and the slap indicator is adapted to provide feedback regarding a slap administered to the area of the back portion.

In still another embodiment of this aspect, the wearable garment or form comprises an air bellows pump assembly.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 6. It will be appreciated that the apparatus may vary as to configuration and as to details of the parts, and that the method may vary as to the specific steps and sequence, without departing from the basic concepts as disclosed herein.

Figure 1:
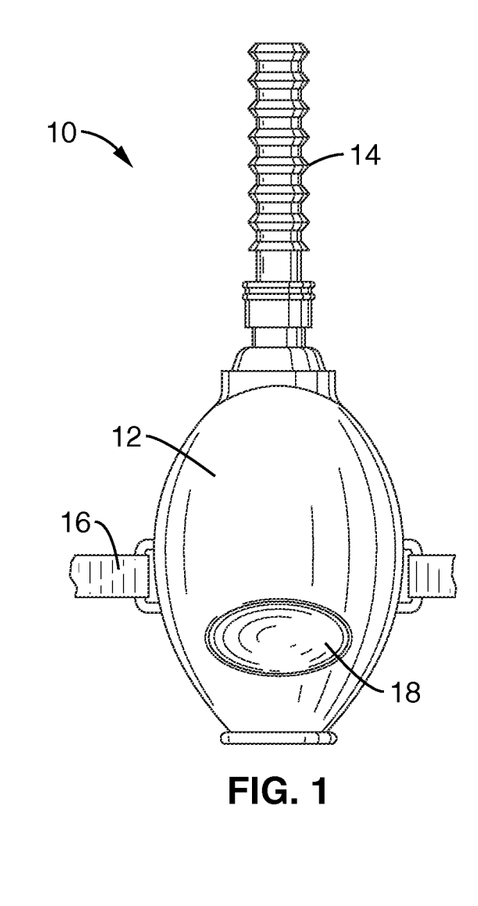
FIG. 1 is a front view of a belted embodiment of the apparatus according to the present invention.
Figure 2:
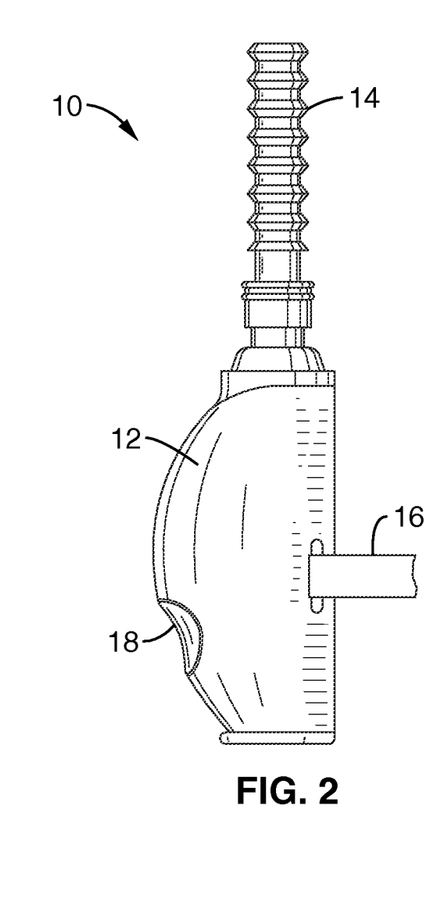
FIG. 2 is a side view of a belted embodiment of the apparatus according to the present invention.

Referring to FIGS. 1 and 2, the teaching apparatus 10, in its most basic embodiment, comprises an inflatable bladder or bag 12 attached to a tube 14. The bag 12 can be self-inflatable or inflatable by any conventional means, such as by pumping or by using a spring-loaded or compressed trigger release device. The bag may also be replaced with an air-bellows pump or assembly. The bag 12 is coupled to a belt 16. The belt 16 is attached to a person or object on which the Heimlich or Abdominal Thrust maneuver is practiced. The teaching apparatus 10 allows the Heimlich or Abdominal Thrust maneuver to be practiced on oneself, on a second person, or on a dummy or other inanimate object (e.g., the "subject"). Alternatively, the bag 12 may be coupled to or incorporated into a form that mimics a human torso (FIGS. 3A-3D). In such an embodiment, the bag 12 is attached to or molded into the form in the proper position relative to the rib cage and navel. The form can then be strapped onto the subject using either a belt 16 (as shown) or incorporated as a vest that is worn (not shown) by the subject. The belt 16 or vest could be secured using any method known in the art (e.g., buckles, D-rings, hook-and-loop fasteners, etc.).

The bag 12 may include an indentation 18 adapted to accommodate the thumb or first region of a user. The indentation 18 assists in proper placement of the hands when performing the Heimlich or Abdominal Thrust maneuver.

Figure 3A:
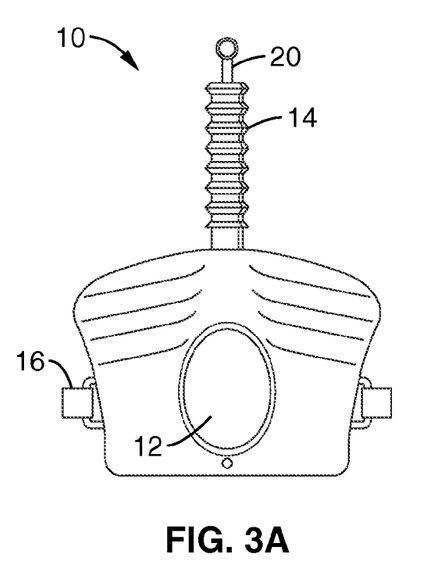
FIGS. 3A-3C are views of another embodiment of the apparatus of the present invention.
Figure 3B:
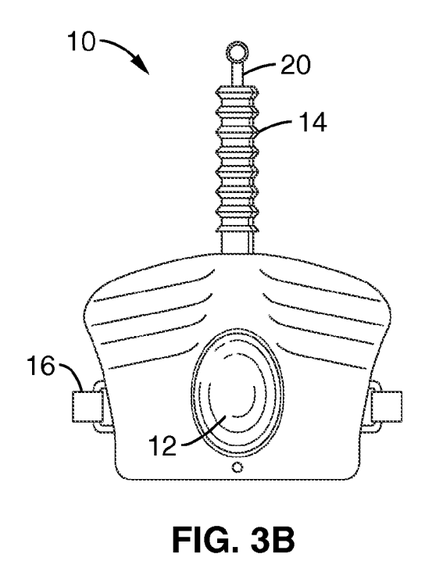
Figure 3C:
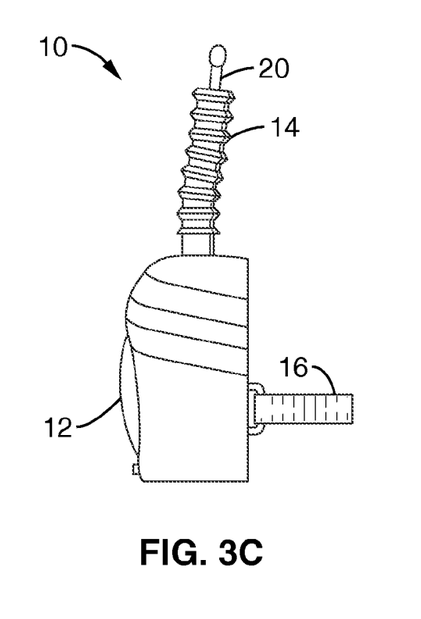
Figure 3D:
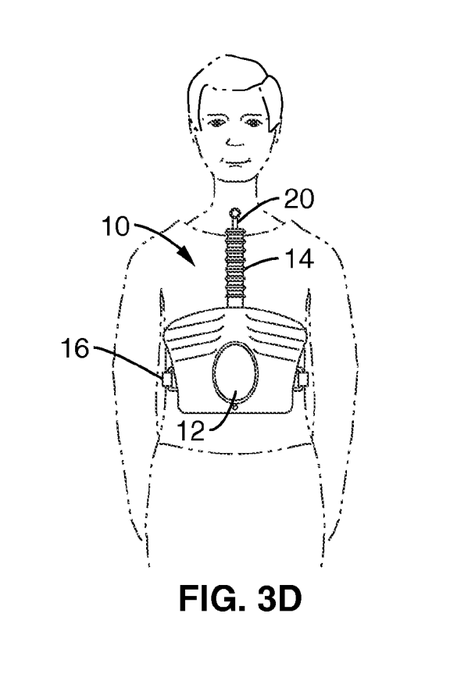
FIG. 3D shows the embodiment of FIGS. 3A-3C as worn by a human subject.

Referring to FIGS. 3A and 3C, the tube 14 extends upwardly from the bag 12 and may include a clip (not shown) to attach to the subject. The tube 14 is oriented upwardly in relation to the bag 12, and can be secured in a position similar to a windpipe, as shown in FIG. 3D. An indicator 20 is placed in the end portion of the tube 14. The indicator 20 may be a plug or other body, such as a small ball, that blocks the end of the tube 14, or it may be a valve, such as a pop-off valve. If the indicator 20 is a small body that does not firmly seat in the end of the tube 14, the indicator 20 can be attached to the tube 14 to prevent escape or to ensure proper positioning of the indicator 20.

When the proper technique is used with the teaching apparatus 10, a sharp burst of air, or "cough", is produced, and the indicator 20 is expelled from the tube 14. If improper technique is used, the requisite sharp burst of air is not produced, and the indicator 20 remains in the tube 14. If, for example, a pop-off valve is used as the indicator 20, the valve can be adapted to open at the correct pressure level, showing that proper technique was utilized.

The indicator 20 can also be made of a sponge- or foam-type material in a substantially cylindrical shape. This type of indicator 20 would fit somewhat loosely into the tube 14, and would also be propelled from the apparatus with the application of the proper technique. However, if improper technique is used, such as not pressing the bag 12 rapidly enough, air will escape around the indicator 20, and the indicator 20 will remain in place in the tube 14 and not be propelled. The difference between proper and improper technique is readily apparent: in some embodiments, proper technique will propel the indicator 20 a significant distance from the subject, while improper technique will fail to propel the indicator 20 from the tube 14 at all.

Alternatively, the indicator 20 could be made of a material that fits more tightly inside the tube 14, or that is or incorporates a gauge, a pop-off or other valve, a streamer, or that emits a sound that indicates that proper or improper technique was used.

Figure 4A:
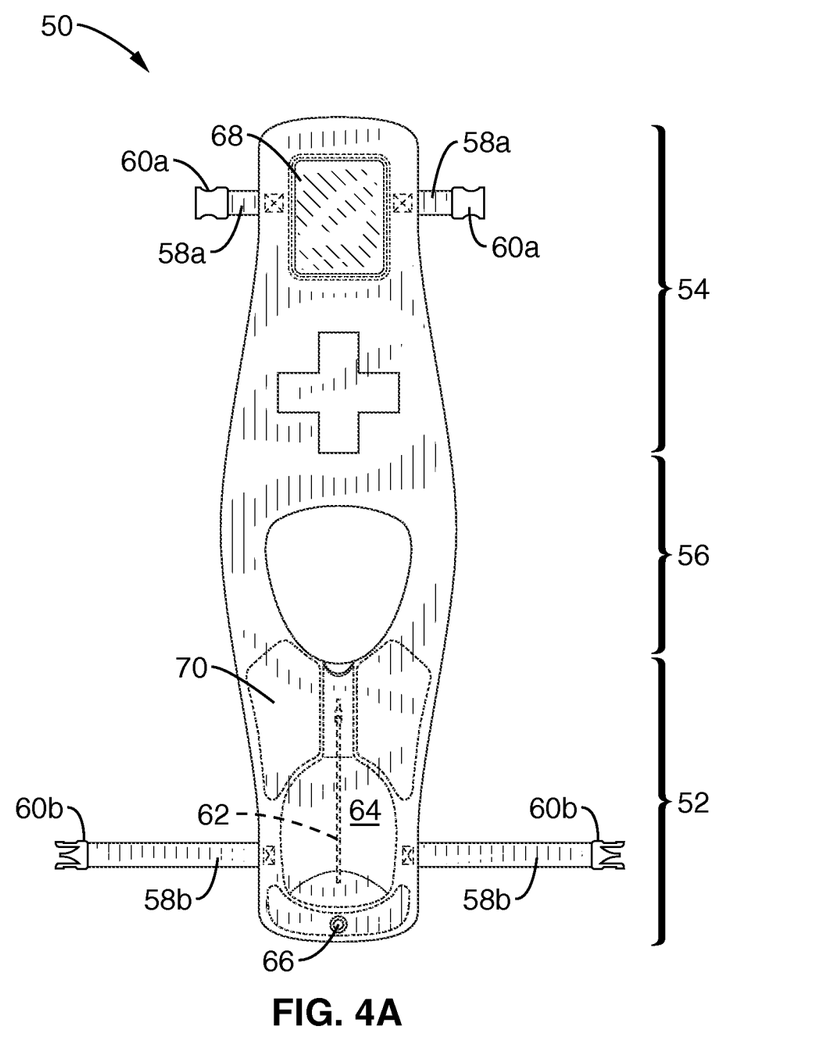
FIGS. 4A-4B are views of another embodiment of the invention, shown as a vest-type garment.
Figure 4B:
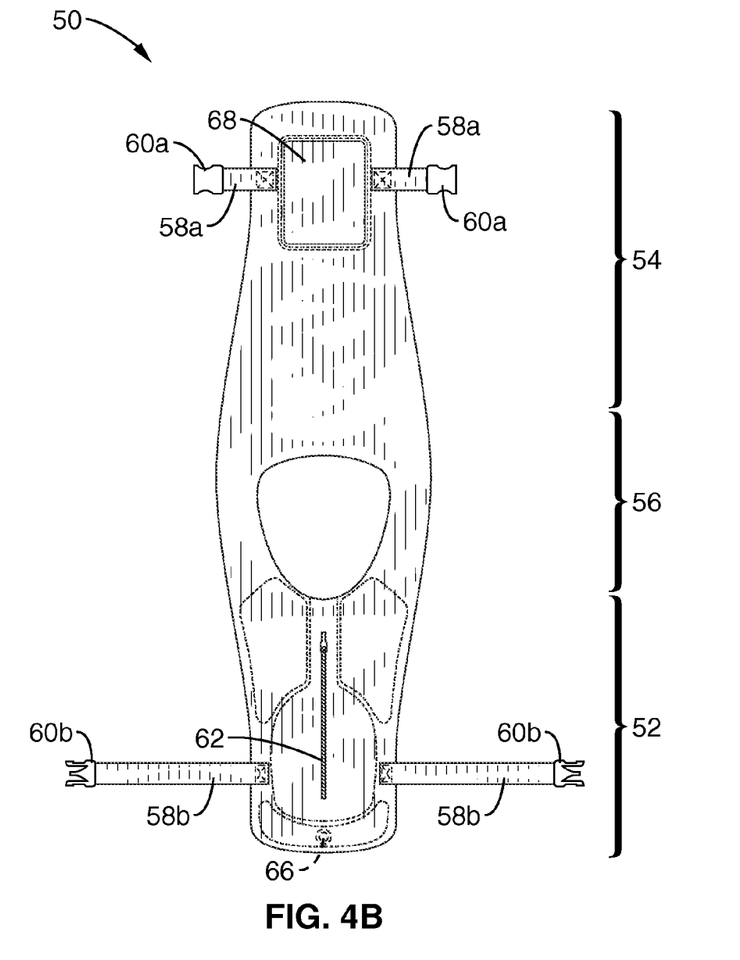
Figure 4C:
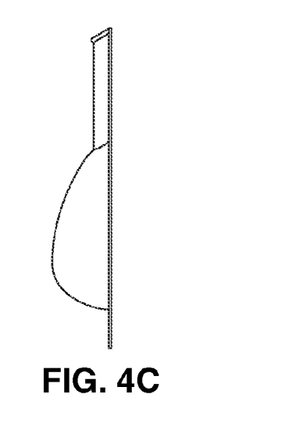
FIGS. 4C-4D are detail views regarding the pouch in the embodiment shown in FIGS. 4A-4B.
Figure 4D:
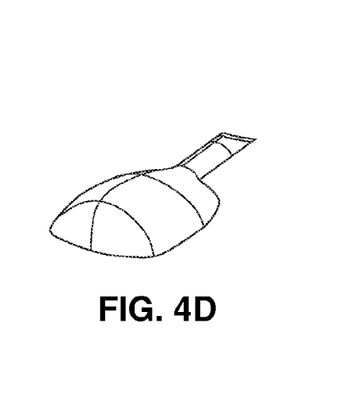

As noted above, the teaching apparatus 10 can be incorporated into various wearable embodiments. Referring to FIGS. 4A-4D, the apparatus 10 is incorporated into a garment 50 that is a wide strip of material having a front portion 52, a back portion 54, and shoulder areas 56 joining the front and back portions. FIG. 4A depicts the outside surface of the garment 50 (visible to an observer), while FIG. 4B depicts the inside surface (adjacent the subject's body; not visible to an observer). As shown in the figure, the back portion 54 includes a belt 58a with buckle ends 60a on either side. The front portion 52 also includes a belt 58b having the other half of the buckle 60b, such that the garment 50 is belted about the wearer and does not move. Any type of fastening means known in the art is appropriate, such as, but not limited to, D-rings, snaps, plastic or metal buckles, or hook-and-loop closures. At a bare minimum, the bag 12 and tube 14 are incorporated into the front portion 52. The bag 12 and tube 14 may be attached to the front portion 52 using hook-and-loop closures or other fastening means, or may be enclosed within the garment 50 itself. This enclosure may be accomplished by using a zipper or other closure 62 on the reverse side of the front portion 52, that is, on the inward-facing side, to allow a pouch 64 in the garment 50 to open and the bag 12 and tube 14 to be inserted therein. FIG. 4C is a side view of the front portion 52, showing the pouch 64 from the outside. FIG. 4D shows the interior contour of an embodiment of the invention.

Other embellishments of the front portion 52 are possible. For example, a small protrusion 66 may be included to indicate belly button position to aid in proper technique. The back portion 54 may contain a pocket 68 to hold an information card (not shown) having instructions or other printed matter thereon. The pocket may include a clear window and allow viewing of the card without removal and protect the card when necessary. The garment 50 may contain padding 70 to better simulate a human or animal form or to provide comfort. Similarly, the garment 50 may be contoured to for better positioning, such as to demonstrate rib placement on the wearer. The indicator 20 can be attached to the garment 50 or the tube 12 to prevent loss, noting that the indicator 20 may be propelled away from the garment 50.

Figure 5:
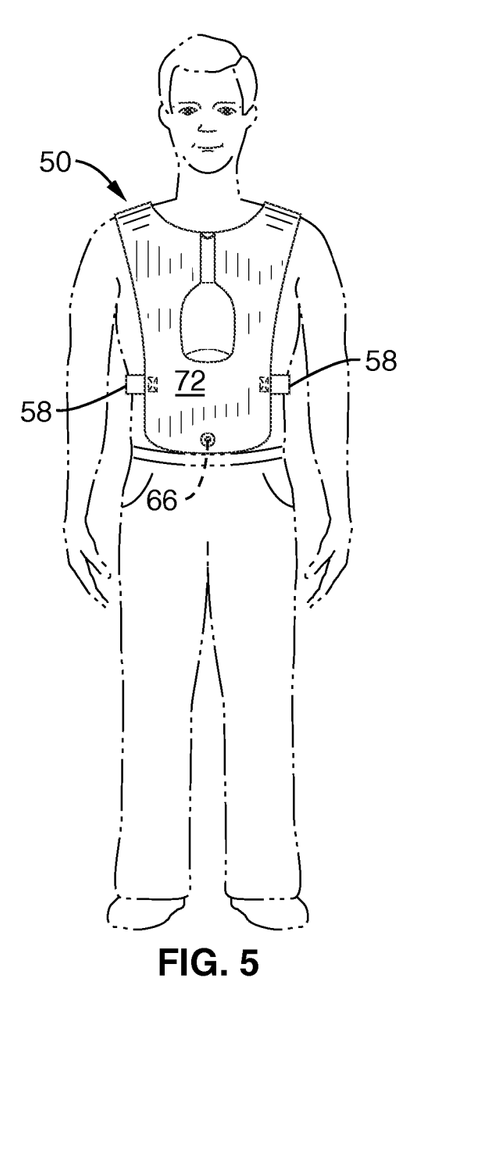
FIG. 5 is a front view of another embodiment of the present invention.

Various embodiments of the teaching apparatus 10 are possible that address special classes of individuals requiring different techniques. For example, a basic average-sized adult embodiment could be scaled down to a child-sized or an infant-sized embodiment, or a version could be made to mimic a pregnant or obese adult. BY way of example, FIG. 5 shows an embodiment of the teaching apparatus 10 that mimics a pregnant or obese person. The actual bag/bladder, tube, and indicator assembly 12, 14, 20 would be located higher up, over the sternum area, because this is the proper location in which to administer the Heimlich or Chest Thrust maneuver in persons of this body type. Optionally, a feature can be added to the teaching apparatus 10 below the bag 12 as belly 72, which corresponds to the abdomen of a person. In such an embodiment, belly 72 can be inflated or made larger by other means so as to resemble a small beach ball that sits below the sternum area.

As noted hereinabove, the bag or bladder 12 can be molded into a wearable form that mimics a human body. The bladder may be self-inflatable or inflatable by any conventional means, which may be located within the wearable form, or may be external to it.

The teaching apparatus 10 is also versatile, in that it can be worn by a person, a mannequin, or even a pet. It can be used with the wearer in any position, such as standing, lying down, or sitting, to teach proper technique. It can be used by a single person to teach self-rescue. The apparatus is reusable, washable, and can be disassembled for repair or replacement of parts. The bag, tube, and indicator assembly 12, 14, 20 can be used with straps, belts, or a shield instead of in a vest; the requirement is that the bag is placed in the proper position for administration of the maneuver.

Figure 6:
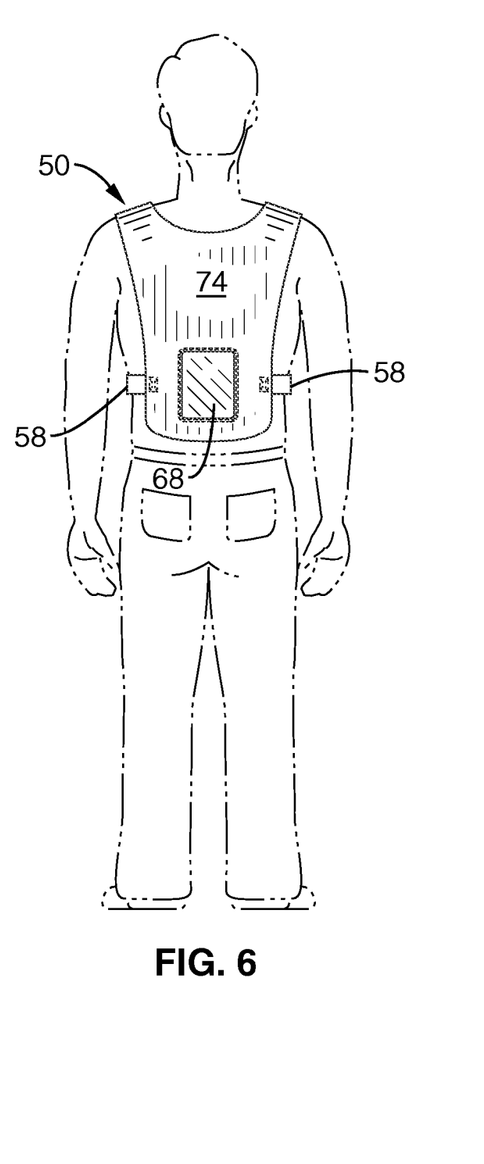
FIG. 6 is a back view of another embodiment of the present invention.

Finally, further modifications are possible to incorporate techniques taught elsewhere. For example, in Europe, a portion of the choking protocol includes administering back slaps to the choking victim. The rear portion of a vest can include an area of foam, material, or perhaps an air bladder between the shoulder blades to incorporate the back slapping. This area 74 can be coupled with a slap indicator, which can provide visual feedback, non-visual feedback, or both, to signal proper or improper use of the technique. This modification can be added to any embodiment of the present invention.

It bears noting that the indicator in the apparatus of the present invention will only indicate proper technique when proper technique is applied. The indicator will not show a positive result if the hands are placed improperly, if an improper amount of pressure is applied, if the pressure is applied in an improper direction, etc. The molded "rib cage"-like portions and the navel portion or indentations are used to ensure proper placement of the hands.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for teaching proper Heimlich or Abdominal Thrust maneuver technique, comprising:
   an inflatable bladder;
   a tube having first and second ends, said first end connected to said bladder; and
   an indicator associated with said second end of said tube;
   wherein said indicator is configured to indicate that a minimum threshold compression rate resulting from a force applied on said inflatable bladder was achieved;
   wherein said minimum threshold compression rate corresponds to the effectiveness of the applied force in simulating the Heimlich or Abdominal Thrust maneuver technique on said bladder and;
   wherein said bladder has means to secure said bladder over an abdominal region of a person or an inanimate body.

2. An apparatus for teaching proper Heimlich or Abdominal Thrust maneuver technique, comprising:
   an inflatable bladder;
   a tube having first and second ends, said first end connected to said bladder; and
   an indicator associated with said second end of said tube;
   wherein said indicator is configured to indicate that a minimum threshold compression rate resulting from a force applied to the bladder was achieved;
   wherein said minimum threshold compression rate corresponds to the effectiveness of the applied force in simulating the Heimlich or Abdominal Thrust maneuver technique on said bladder; and
   wherein said bladder is contained in a wearable garment.

3. An apparatus as recited in claim 2:
   wherein said wearable garment comprises front and back portions;
   said bladder being located within said front portion of the wearable garment;
   wherein said back portion comprises a slap indicator associated with an area of said back portion; and
   wherein said slap indicator is adapted to provide feedback regarding a slap administered to said area of said back portion.

4. An apparatus as recited in claim 2:
   wherein said tube is configured to be vertically oriented during operation;
   wherein the tube comprises a lower end in communication with said bladder and an open upper end;
   wherein said indicator comprises a movable body insertible into said tube; and
   wherein said indicator is forced out of said upper end of said tube when a force having the minimum threshold compression rate and compression pressure is applied to said bladder.

5. An apparatus as recited in claim 2,
   wherein said indicator is physically attached to the apparatus; and
   wherein said indicator remains attached to the apparatus while indicating the minimum threshold compression rate and compression pressure.

6. An apparatus as recited in claim 2, wherein said indicator provides visual feedback.

7. An apparatus as recited in claim 2, wherein said indicator provides non-visual feedback.

8. An apparatus for teaching proper Heimlich or Abdominal Thrust maneuver technique, comprising:
a wearable garment or form;
wherein said wearable garment or form comprises:
an air bladder or cavity, and
a tube having first and second ends, said first end connected to and in fluid communication with said air bladder or cavity; and
an indicator associated with said second end of said tube;
wherein said indicator is configured to indicate that a minimum threshold air displacement rate resulting from a force applied on said air bladder or cavity was achieved; and
wherein said-minimum threshold air displacement rate corresponds to the effectiveness of the applied force in simulating the Heimlich or Abdominal Thrust maneuver technique on said bladder or cavity.

9. An apparatus as recited in claim 8, wherein said air bladder or cavity is molded into said wearable garment or form.

10. An apparatus as recited in claim 8, wherein said air bladder or cavity is removable from said wearable garment or form.

11. An apparatus as recited in claim 8, wherein said wearable garment or form mimics at least a portion of a mammal.

12. An apparatus as recited in claim 8, wherein said indicator provides visual feedback.

13. An apparatus as recited in claim 8, wherein said indicator provides non-visual feedback.

14. An apparatus as recited in claim 8:
wherein said wearable garment or form comprises front and back portions;
said bladder or cavity being located within said front portion of the wearable garment;
wherein said back portion comprises a slap indicator associated with an area of said back portion; and
wherein said slap indicator is adapted to provide feedback regarding a slap administered to said area of said back portion.

15. An apparatus as recited in claim 8, wherein said wearable garment or form comprises an air bellows pump assembly.

16. An apparatus as recited in claim 8:
wherein said tube is configured to be vertically oriented during operation;
wherein the tube comprises a lower end in communication with said bladder and an open upper end;
wherein said indicator comprises a movable body insertible into said tube; and
wherein said indicator is forced out of said upper end of said tube when a force having a minimum threshold compression rate and compression pressure is applied to said bladder.

17. An apparatus for teaching proper Heimlich or Abdominal Thrust maneuver technique, comprising:
a compressible container;
an outlet coupled to said compressible container; and
an indicator coupled to or inserted in said outlet;
wherein said indicator is configured to indicate that a minimum threshold compression rate resulting from a force applied on said compressible container was achieved;
wherein said compressible container is included in a wearable garment or form; and
wherein said minimum threshold compression rate corresponds to the effectiveness of the applied force in simulating Heimlich or Abdominal Thrust maneuver technique on said compressible container.

18. An apparatus as recited in claim 17, wherein said wearable garment or form comprises an air bellows pump assembly.

19. An apparatus as recited in claim 17:
wherein said outlet is configured to be vertically oriented during operation;
wherein the outlet comprises a lower end in communication with said compressible container and an open upper end;
wherein said indicator comprises a movable body insertible into said outlet; and
wherein said indicator is forced out of said upper end of said outlet when a force having the minimum threshold compression rate and compression pressure is applied to said compressible container.

* * * * *